United States Patent [19]

Nunberg

[11] Patent Number: 4,789,941
[45] Date of Patent: Dec. 6, 1988

[54] COMPUTERIZED VEHICLE CLASSIFICATION SYSTEM

[76] Inventor: Bennett Nunberg, 24 Grist Mill Dr., Kings Park, N.Y. 11754

[21] Appl. No.: 887,899

[22] Filed: Jul. 18, 1986

[51] Int. Cl.⁴ .............................................. G01S 15/06
[52] U.S. Cl. ................................... 364/436; 340/943; 340/933; 367/97
[58] Field of Search ............... 364/424, 562; 340/943, 340/933; 367/90, 97, 102

[56] References Cited

U.S. PATENT DOCUMENTS

| | | | |
|---|---|---|---|
| 3,214,729 | 10/1965 | Frielinghaus | 340/943 |
| 3,343,167 | 9/1967 | Rademacher | 340/943 |
| 3,506,809 | 4/1970 | Pallat | 340/943 |
| 3,675,190 | 7/1972 | Auer, Jr. et al. | 340/943 |
| 3,872,283 | 3/1975 | Smith et al. | 340/933 |
| 4,187,487 | 2/1980 | Numata et al. | 367/93 |
| 4,674,069 | 6/1987 | Mizuno | 367/90 |

Primary Examiner—Parshotam S. Lall
Assistant Examiner—Thomas G. Black
Attorney, Agent, or Firm—Schweitzer & Cornman

[57] ABSTRACT

A computerized ultrasonic system is disclosed for classification of vehicular traffic, as at a toll collection booth. An ultrasonic ranging unit is mounted above the traffic lane, facing downward. The unit is activated by the presence of a vehicle and proceeds to measure repetitively the momentary vertical distance of the vehicle from the ranging unit. Processing circuitry is provided to ascertain average and maximum height, rejecting aberrational readings, such as from an antenna. The computerized system may include a "look-up" of standard vehicular categories, enabling classification of vehicles by comparison of the data received with preprogrammed standard categories.

7 Claims, 4 Drawing Sheets

HEIGHT = BASE − READING

COMPUTERIZED VEHICLE CLASSIFICATION SYSTEM

BACKGROUND AND SUMMARY OF THE INVENTION

In connection with the collection of tolls at toll bridges, turnpike entrances or exits, etc., vehicle classification typically is a manual function possibly in conjunction with a treadle arrangement or the like for making an axle count. Attempts to automate this procedure in the past have not proven particularly successful and/or economically justifiable, because of the wide variety of vehicle configurations, somewhat hostile working environments, etc. The present invention is directed to a novel, highly simplified and economical computer-based system for automatic classification of vehicular traffic. In one of its simplest forms, the system of the invention may be used principally as an auditing system against which to verify the toll receipts at a given booth. With relatively simple additions, however, the system can be adapted for automatic toll calculation for a variety of vehicles. In another alternative form, the classification system may be utilized without regard to toll collection and/or calculation to automatically control the flow of vehicular traffic. For example, the systems may be used to identify a passenger bus and admit it into a restricted traffic lane, while excluding vehicles of all other types.

The system of the invention makes use of a commercially available ultrasonic ranging unit, which is mounted directly above the vehicular traffic lane and arranged to transmit pulses of ultrasonic energy downward toward the roadway surface. When a vehicle transits the detection zone, the ranging unit repetitively samples the distance from the proper vehicle to the ranging unit. Individual readings can be processed in a variety of ways, to provide a profile of the vehicle, to determine its average height, and to determine maximum height of the vehicle. Particularly in respect to the latter, the system of the invention provides for successive height readings to be compared with prior and subsequent readings and for rejection of aberrational readings, such as might result from the presence of an upstanding post or the like on the vehicle, not actually representing a true height characteristic of the vehicle.

In accordance with one aspect of the invention, the ultrasonic ranging unit may be utilized in conjunction with a wheel-actuated treadle positioned in the roadway area slightly in advance of the ranging unit. The treadle mechanism may be utilized not only to activate the ranging unit, but also to provide an axle count in conjunction with the vehicle height profile information as part of the classifying information.

A microprocessor system, forming part of the invention, includes a programmable read-only memory (PROM or EPROM) preprogrammed with classification data for as many classes of vehicles as the operator desires to establish. In one version of the system of the invention, the input data from the passage of a vehicle under the ranging unit and axle counting treadle is referenced sequentially to the various pre-programmed classifications in the look-up table formed by the PROM or EPROM unit. When a satisfactory match is achieved, the vehicle classification data is output to whatever purpose and function is desired, whether it be merely auditing toll receipts, calculating tolls, regulating traffic flow, or the like.

With the system of the invention, the foregoing and many other functions may be performed in a highly reliable manner, with a system that is basically simplified and economical to install and operate.

For a more complete understanding of the above and other features and advantages of the invention, reference should be made to the following detailed description of preferred embodiments of the invention and to the accompanying drawings.

DESCRIPTION OF PREFERRED EMBODIMENTS OF THE INVENTION

Figure 1:
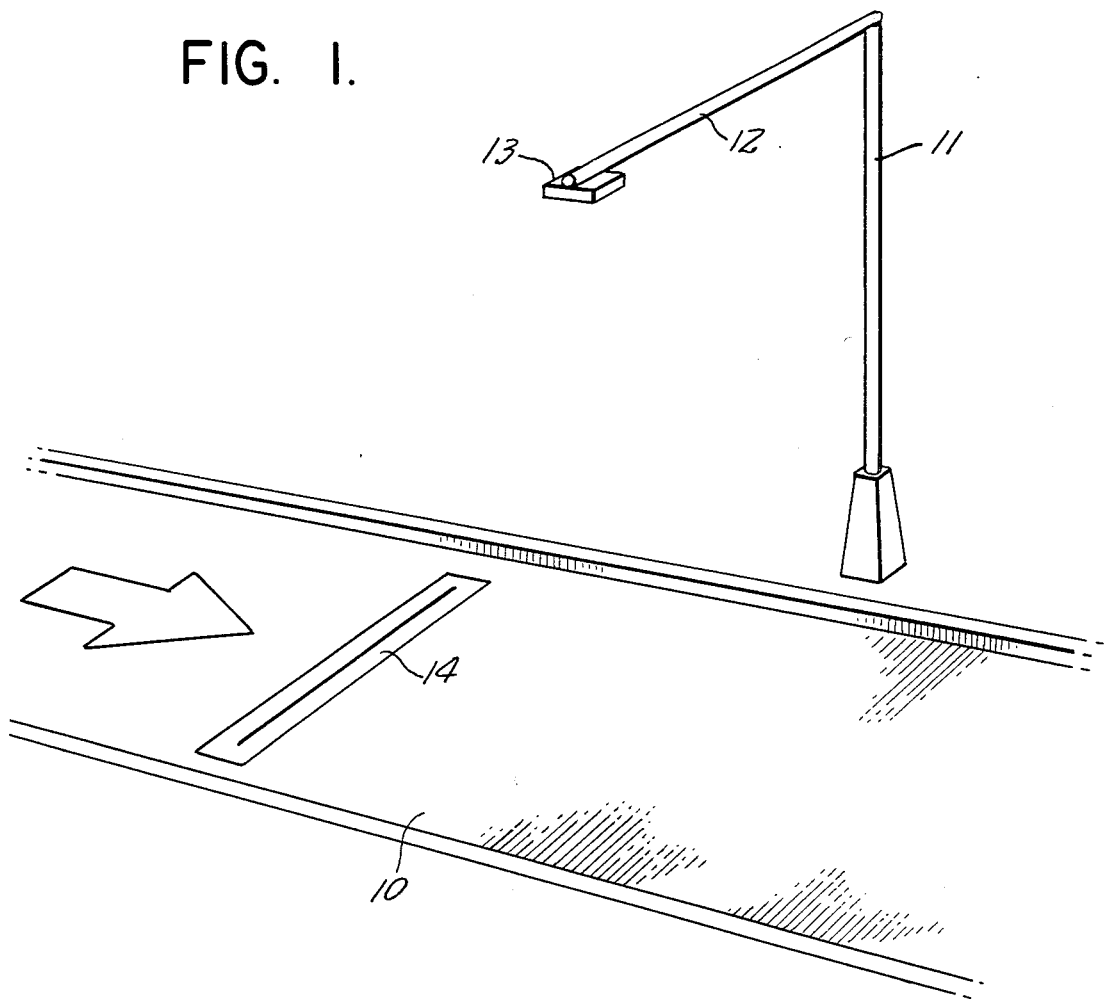
FIG. 1 is a fragmentary perspective illustration of a vehicular traffic lane fitted with a wheel-acuated treadle and a down-looking ultrasonic ranging unit, according to the principles of the invention.
Figure 2:
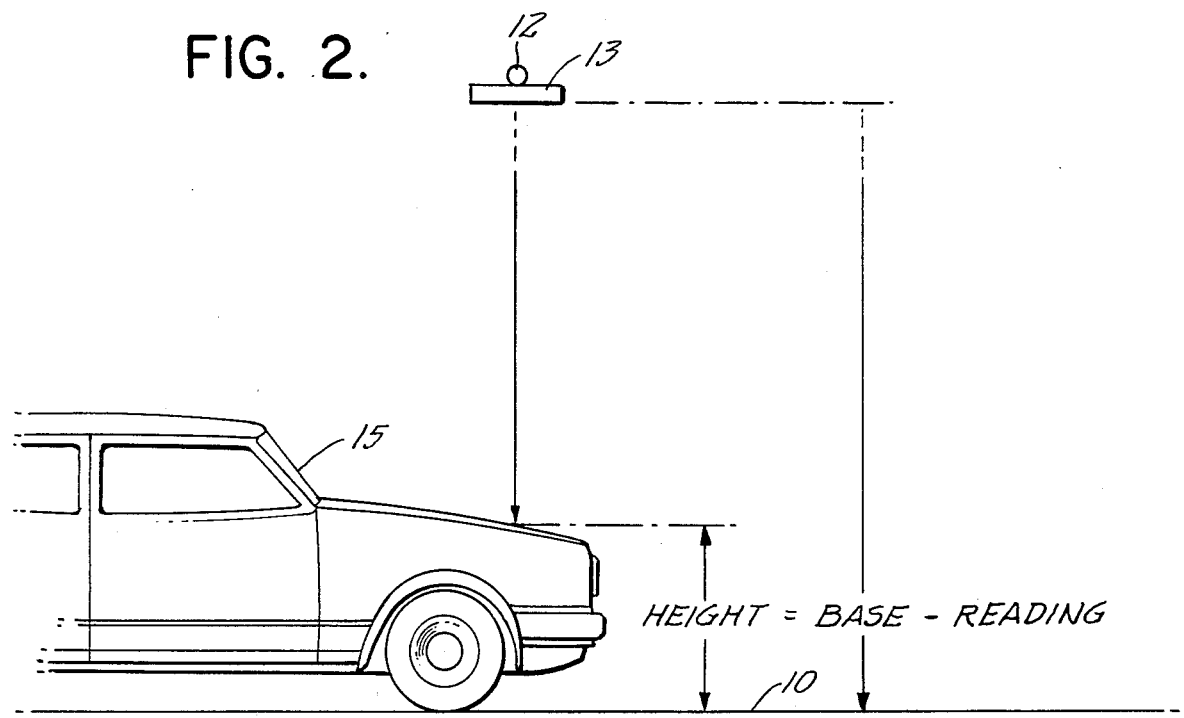
FIG. 2 is a fragmentary elevational view of the installation of FIG. 1.

Referring now to the drawing, and initially to FIGS. 1 and 2 thereof the reference numeral 10 designates generally a vehicular traffic lane, with traffic intended to flow in the direction from left to right. At a desired point alongside the traffic lane 10 there is mounted a stanchion 11 carrying a cantilever support arm 12 extending out over the traffic lane 10. At the outer end of the arm 12 there is an ultrasonic ranging unit, generally designated by the numeral 13, which is positioned generally over the middle of the traffic lane. The ranging unit 13 is mounted at a position above the maximum height of the largest vehicle contemplated to be passing under it. Preferably, the system of the invention accommodates a max/min range of 31 feet, 10.5 inches, so the mounting height of the ranging unit 13 may be as high as about 32 feet (or considerably lower than that depending on the maximum contemplated vehicle height).

To advantage, a rocker treadle 14 is mounted in the traffic lane 10, in a position to be engaged by the wheels of a passing vehicle 15. Desirably, the treadle is located slightly in advance of the ranging unit 13, so that actuation of the treadle may be utilized to initiate operation of the ranging unit. Preferably, the first "readings" of the ranging unit 13 are of the working level of the traffic lane 10. This enables the unit 13 to adjust for changes in that level, as in the case of accumulations of ice and snow in the wintertime.

As the vehicle 15 projects into the working zone of the ranging unit, successive "readings" of the ranging unit reflect the distance from the unit to the vehicle which, when compared with the distance from the ranging unit to the surface of the traffic lane, provide a measure of vehicle height. As successive readings are taken, and the data is stored, sufficient information is derived to provide a vehicle height profile, a measure of average vehicle height, and, in addition, a measure of the maximum height of the vehicle. The measuring sequence is terminated when the reading returns to zero (and/or when an exit treadle is activated, if one is employed).

To advantage, the ranging unit is a Polaroid Ultrasonic Single Frequency Board, No. 607089, available commercially from the Polaroid Corporation. The unit includes transmitter and receiver circuitry, and a transducer capable of directional transmission and reception of ultrasonic energy pulses. The unit itself, being well known and commercially available, forms no part of the invention. Rather, the invention is directed to the manner in which the unit is employed and the circuit arrangements utilized.

To advantage, the controlling circuitry for the ranging unit 13 is established to provide target distance resolution in increments of 1.5 inches. Up to 256 such increments may be counted by the microprocessor circuitry within a single byte of internal memory. To this end, the microprocessor circuitry, to be described in somewhat more detail, is designed to provide a 222 microsecond timer, with each 222 microsecond unit of time representing 1.5 inches of distance at a normal speed of sound in air of approximately 1100 feet per second. By counting the number of time units between the transmission of the ultrasonic pulse and the subsequent reception of its echo, an accurate measure of the distance of the vehicle from the ranging unit may be derived.

In the particular form of ultrasonic ranging provided, there is a slight degree of variability between the instant of energization of the ranging unit and the transmission of an energy pulse. Accordingly, the initial energizing of the unit is not utilized to initiate pulse timing. Rather, a signal generated by the ultrasonic ranging unit, at the time pulse transmission is commenced, is utilized as an interrupt input to the microprocessor, providing repetitive accuracy in pulse timing.

As soon as a transmit-receive cycle has been completed, a new cycle can be initiated. In a typical system, ranging pulses can be initiated several times per second, providing a considerable body of measuring data for a vehicle passing underneath.

Pursuant to one aspect of the invention, each ranging pulse is compared with the previous pulse. If the difference exceeds a predetermined amount, preferably about 12 inches, the data is momentarily considered to be aberrational, at least for the purpose of establishing maximum vehicle height. Of course, if the data value is substantially repeated on the next pulse cycle, the present-to-previous signal comparison will "normal", and the data is utilized in the normal way. This enables the system to ignore atypical physical characteristics, such as an upstanding pipe, table leg, etc., not fairly representative of the real characteristics of the vehicle.

Desirably, the system incorporates certain additional features to avoid recordation of aberrational data. One such feature is the rejection of height data readings below a predetermined minimum. In this respect, in some cases it may be desired to omit the treadle device, and rely exclusively upon the ranging unit itself to determine the entry and exit of vehicles from the ranging area. Particularly in such cases, height readings below a minimum height and/or for too short a period of time may be ignored, to avoid aberrational data from windborne debris, etc.

Figure 3:
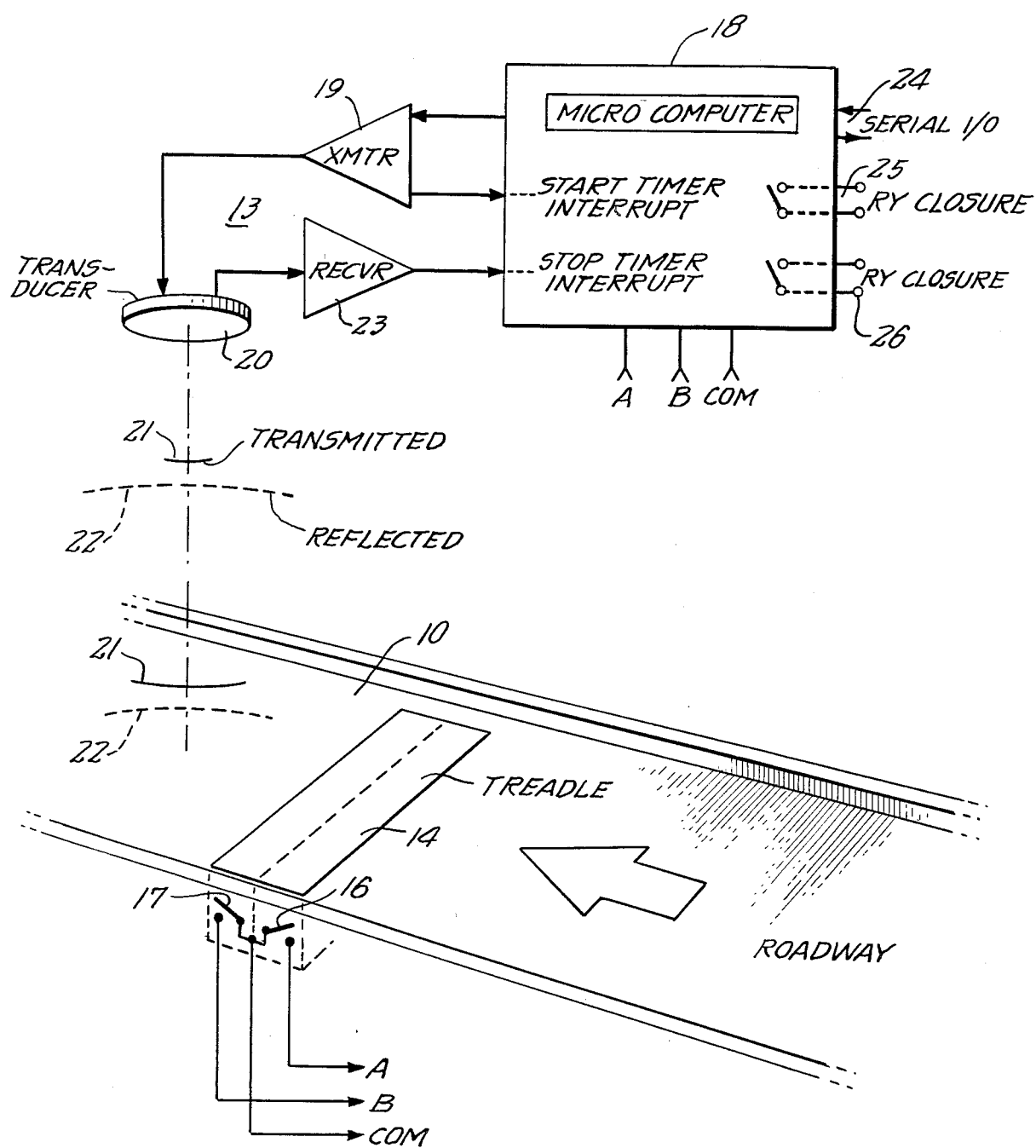
FIG. 3 is a highly simplified, schematic representation of certain of the control features of the system of FIG. 1.

With reference to FIG. 3, the treadle arrangement 14 is shown as having two sets of switch contacts (16, 17), arranged to be actuated in sequence by the passage of a vehicle wheel, moving from right to left in FIG. 3. Closure of the switches in the proper sequence signifies the movement of a vehicle in the right direction and through conductors A and B initiates operation of a microcomputer system, generally designated by the numeral 18 in FIG. 3. The transmitter circuit 19 of the ranging unit is thereupon activated, causing a pulse to be discharged by the transducer 20. The transmitted pulse is represented in FIG. 3 by the solid curved line 21, and its reflected echo by the dotted line 22. The echo is received by the transducer, as a time function of the distance to the reflecting surface (either the roadway surface or the top surface of an intruding vehicle) and the received signal is transmitted through the receiver circuitry 23 to the stop timer interrupt of the microprocessor. The data accumulated by the microprocessor 18, in the course of a vehicle-measuring sequence, is transmitted to a remote terminal device which may be a memory device, printer, CRT, traffic control gate, toll calculator, or various combinations of the foregoing and other output devices. To this end, the microprocessor has a serial I/O port 24 for sending and receiving data to and from from such terminal devices (not shown). In addition, the microprocessor advantageously includes one or more relay energizing circuit outlets 25, 26, which may be utilized for controlling power devices. By way of example, such relay devices may be utilized for lifting and lowering of a gate for the control of traffic flow.

Figure 4:
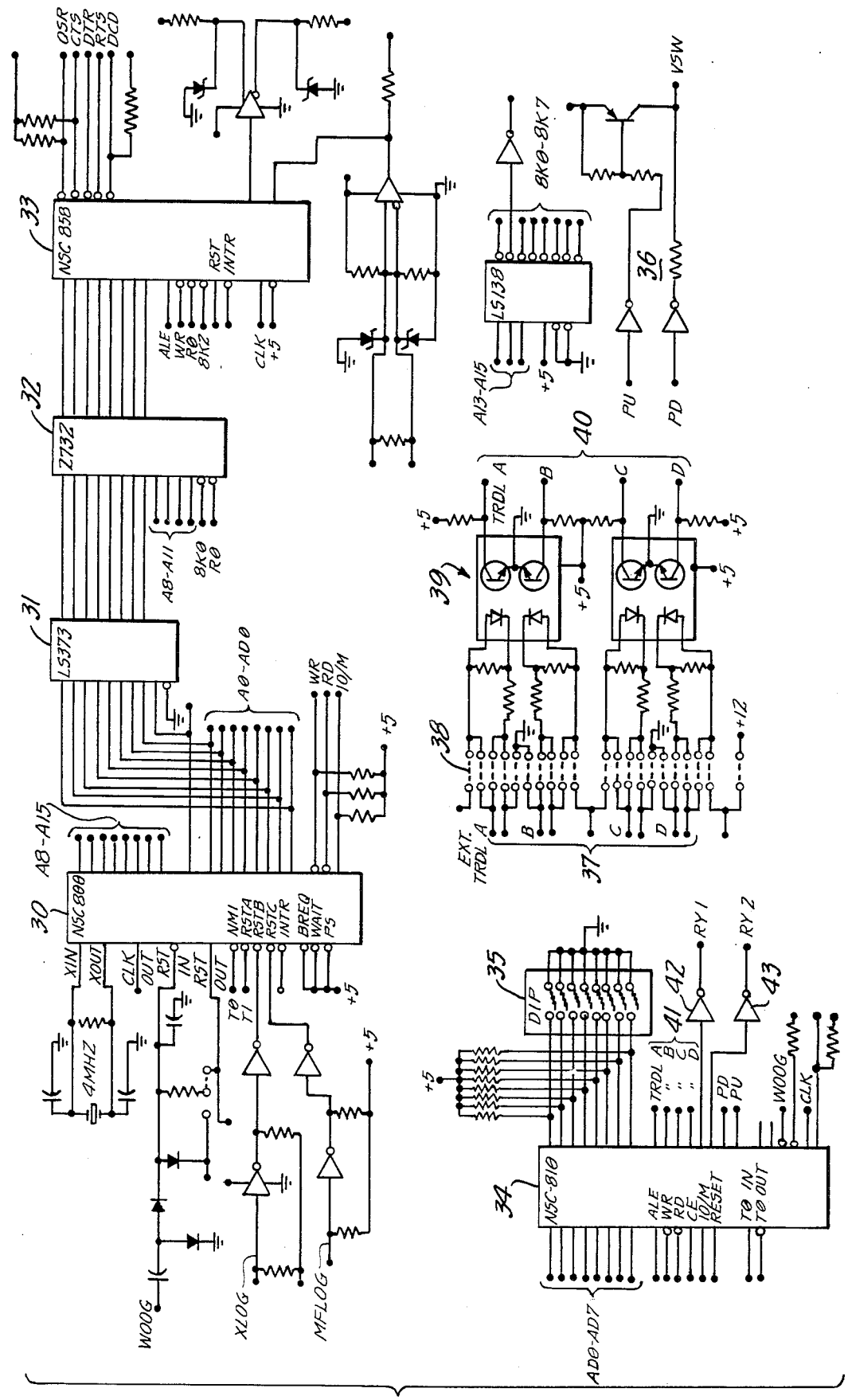
FIG. 4 is a simplified electrical schematic of the control system according to the invention utilized in conjunction with the ranging unit of FIG. 1.

With reference now to FIG. 4, the reference numeral 30 designates generally an integrated circuit block forming the principle microprocessor. Desirably, the microprocessor unit is a NSC 800, made available commercially by National Semiconductor Corporation. Operating in conjunction with the microprocessor unit 30 is an LS373 line bus driver 31, a 2732 EPROM unit 32 and a UART (NSC858), made available commercially by National Semiconductor Corporation. An NSC810 logic chip, made available by National Semiconductor Corporation, is connected to the microprocessor unit 30 via numerous input/output conductors, including AD0-AD7 providing fixed function inputs through DIP switch 35. To the outputs, PD, PU from the logic chip 34 control a circuit 36 for energizing the transducer 20 of the ranging unit. When the respective outputs PD,PU are activated, the output energy level for the transducer is up (PU) or down (PD) with conductor VSW representing the energizing output to the transducer.

External treadle switches are indicated at 37. There may be provision for two sets of treadle switches, to indicate both entry of the vehicle into the measuring zone, and its subsequent exit. In such cases, there will be four sets of treadle contacts, A–D. Typically, however, a single treadle, having one pair of contacts (A & B) is sufficient. In the illustrated circuit arrangement, the external treadle contacts A through D are filtered through an optical isolator arrangement 38 and then processed through appropriate circuitry 39 to provide controlled output voltages at 40 consistant with the requirements of the microprocessor. These signals are input to the logic unit 34 at 41.

Upon detection of a vehicle by the entry side treadle contacts, the ranging unit is actuated via the conductor VSW. Upon transmission of the ranging pulse, a signal is returned by the ranging unit 13 to the input conductor XLOG forming an input to reset RSTB of the microprocessor 30. This commences operation of the 222 microsecond timer. The eventual echo pulse, when received by the ranging unit 13, is input via the conductor MFLOG to reset input RSTC of the microprocessor 30. The interval between the signals received at RSTB and RSTC is reflected by the number of accumulated pulses of the 222 microsecond timer. This data is stored in a memory register of the NSC810 unit 33, where it is compared with the previous data cycle, and also held for comparison with the next data cycle. If the difference between successive readings exceeds a predetermined maximum (for example 12 inches), this reading is ignored for the purposes of determining maximum vehicle height. It is retained, however, for the purpose of comparison with the next successive reading.

Desirably, input of the echo-received signal at the RSTC port of the microprocessor 30 immediately initiates a new measuring cycle by re-energizing the ultrasonic ranging unit 13. This maximizes the number of measuring cycles that can be accomplished with respect to a given vehicle. In this respect, the illustrated system is capable of a typical pulsing rate of from about 13 to about 20 pulses per second. Thus, if a vehicle is passing under the ranging unit at, say, five miles per hour, the system is able to complete height sampling at intervals of about four to six inches over the length of the vehicle. Even were the vehicle traveling at a considerably greater speed, there would be ample opportunity for multiple sampling cycles to be completed. In this respect, the pre-programmed memory element 32 advantageously includes provision for ignoring altogether any series of readings not including a minimum number of height readings in excess of a desired height threshold. This substantially avoids erroneous readings from wind blown debris, for example, which is particularly important for systems in which the treadle operation is not relied upon to detect the entry and exit of vehicles from the ranging area.

After a series of height samplings has been made on a vehicle, and the exit of that vehicle from the ranging area has been established, either by actuation of an exit treadle or reversion of the height readings to the level of the roadway surface 10, the accumulated height sampling information, together with an axle count where a treadle device is employed, is compared with the pre-programmed set of vehicle characteristics. The results of the comparison are then transmitted via the serial communication output device (UART) 33 to an appropriate terminal device, such as a printer, CRT, toll calculator, etc. In addition, via the relay output amplifiers 42, 43, a number of functions may be initiated, such as raising or lowering of control gates, controlling signal lights, etc.

Figure 5:
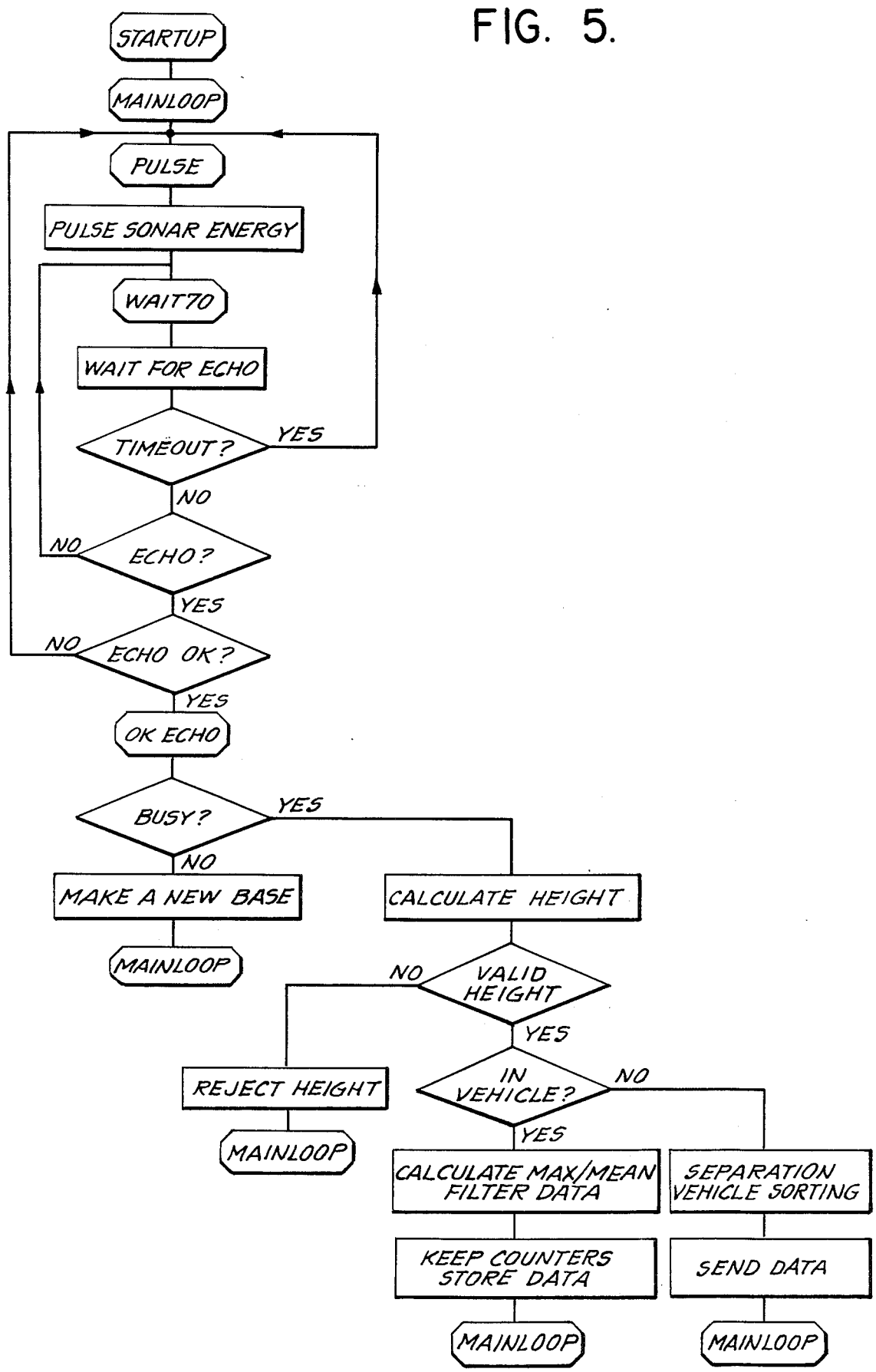
FIG. 5 is a simplified flow diagram of the processing operation employed in the practice of the invention.

With reference to FIG. 5 of the drawings, there is shown a highly simplified, diagrammatical flow diagram of the software functions. Starting at the top, after start-up, the system enters the Main Loop which executes a pulse cycle. The ranging unit then enters into the wait cycle, wherein it waits for receipt of the echo. If the time period expires without receipt of an echo, the system recycles to a new pulse phase. If an echo is received, then the echo values are compared to pre-established max/min limits to determine if the echo is "valid". If not, it is rejected and a new echo pulse is initiated.

If a valid echo is received, as determined at the "okecho?" stage in FIG. 5, the processing proceeds to the next stage where it is determined whether there is in fact a vehicle in the echo ranging station, typically by ascertaining whether a treadle switch has been actuated. If there is not a vehicle in the ranging position, then the echo reading is utilized to establish the base reference. This is important in the wintertime, for example, where packed snow and ice may progressively elevate the base over which the vehicles travel, and the subsequent thaw cycle will progressively reduce the level of such base. The system of the invention enables these variations in base level to be automatically incorporated into the data reference against which the vehicle height is measured.

If the receipt of a valid echo coincides with the presence of a vehicle, then the program branches off to the height calculation stage. After calculating the height, it is again checked for validity by comparison with previous readings. A substantially anomalous reading is rejected for calculation purposes but saved for comparison purposes, and the system returns to the beginning of the Main Loop. An anomalous height reading may, for example, be an echo from the tip of a radio antenna, from a vertical exhaust pipe of a truck, a post extending from the body of a truck, etc. Such a reading would indicate a substantially greater height than previously, and thus would be treated as an anomaly. If the next subsequent reading is also of a similar height, it would compare reasonably with the previous "anomalous" reading, and thus would be treated as a valid height reading.

In the case of any valid height calculation, there would follow a determination whether the vehicle was still within the echo ranging zone, as will be discussed further, if the response is affirmative, then the data is processed through appropriate data filters and counters to provide both maximum and mean height readings, after which the system returns to the beginning of the Main Loop.

With regard to the determinations made at the "Valid Height?" stage, it is to be understood that a zero height reading, following an indication that a vehicle has entered the ranging zone, is considered a valid height reading. However, such a reading is utilized as a process trigger, at the "In Vehicle?" stage, to signal the exit of a vehicle from the ranging zone. The flow of data then proceeds to the "Separation Vehicle Sorting" stage in which the vehicle profile data is compared with pre-existing data profiles and the vehicle classification is determined by an appropriate match from a classification look-up table. In this respect, the following tables reflect typical vehicle classification structure and typical vehicle profile data:

| Typical vehicle classification structure | |
|---|---|
| Class | Vehicle |
| 1 | Passenger car |
| 2 | Passenger car + 1 axle |
| 3 | Passenger car + 2 axles |
| 4 | Truck with 2 axles |
| 5 | Bus |
| 6 | Truck with 3 axles |
| 7 | Truck with 4 axles |
| 8 | Truck with 5 axles |

| Typical vehicle profile data | | | |
|---|---|---|---|
| No. of axles | Max. height <7'6" | Max. height >7'6" | Average ±1' = max. >7'6" |
| ≦2 | Class 1 | Class 4 | Class 5 |

-continued

| Typical vehicle profile data | | | |
|---|---|---|---|
| No. of axles | Max. height <7'6" | Max. height >7'6" | Average ±1' = max. >7'6" |
| 3 | Class 2 | Class 6 | N/A |
| 4 | Class 3 | Class 7 | N/A |
| 5 | Class A | Class 8 | N/A |
| 6 | Class B | Class D | N/A |
| 7 | Class C | Class E | N/A |

As will be understood, the vehicle classification structure is somewhat arbitrary, and typically will be a function of local ordinance or statute, for example in connection with toll plaza monitoring or the like. However the classification structure may be determined, it is pre-programmed into the look-up table along with the physical data, which typically comprises the number of axles and the height structure, as indicated in the table entitled "Typical Vehicle Profile Data". In the latter table, a vehicle with two axles, and a maximum height less than seven feet six inches, is designated as a "Class 1" vehicle. If the height of the vehicle is in excess of seven feet six inches, it is classified as a "Class 4" vehicle. As a special category, a vehicle having a maximum height greater than seven feet six inches, but whose average height does not vary more than one foot from maximum height, is classified as a bus (Class 5 vehicle in the Typical Vehicle Profile Data Table).

After comparison of the calculated data with the look-up table, the data is output in a desired form. Depending upon the desired end use, this can take the form of a toll calculation for an incoming vehicle, or a toll verification for an outgoing vehicle, for example. The data likewise may be utilized to effect traffic flow control, such as by guiding buses (Class 5 vehicles) into a predetermined express lane, for example.

In the system of the invention, the principal circuitry of FIG. 4 comprises largely off-the-shelf components, which are mounted on a single printed circuit board, providing a small, lightweight, self-contained unit which may be mounted convienently at the end of the pole arm 12, directly over the traffic lane to be monitored. Thus, both the electronic and the mechanical aspects of the system are relatively simple and economical in relation to the functions performed.

Depending on the needs and desires of the end user, the system can be treadle actuated, or the ranging unit may be continuously in operation, with the individual sampling cycles filtered to eliminate system output except in response to the passage of an object large enough to represent a vehicle.

Whether or not treadle-actuated, the system enables ranging pulses to be initiated in an extremely rapid sequence, as the initiation of a subsequent pulse is triggered by the return echo of the previous pulse. It is not necessary to wait for the completion of a fixed time cycle.

The system of the invention may be pre-programmed with a substantial variety of typical vehical classifications, based upon maximum and average height values, axle count where treadle control is utilized and, if desired, certain height profile characteristics. A "look-up table" of such known characteristics, pre-programmed into the EPROM unit 32, is scanned to compare the characteristics of a just-measured vehicle. When an appropriate match is found, a system output is initiated, which may be one or more of a variety of possible outputs involving combinations of printing, display, calculation, auditing, physical actuation of traffic control devices, etc.

Although the system of the invention is perhaps most usefully applied in connection with toll collection plazas, it may be utilized to great advantage as a remote, automatic traffic control device. For example, the system may be set to recognize special vehicles such as passenger buses, and direct them into special lanes dedicated for such vehicles, while excluding all other vehicles.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A computerized vehicular measurement and classification system for moving vehicular traffic within a traffic lane, which comprises:
   (a) an ultrasonic ranging unit for transmitting and receiving an ultrasonic ranging signal,
   (b) means for mounting said ranging unit above the surface of said traffic lane, at a level above the maximum height of vehicles transiting said traffic lane,
   (c) said ranging unit being mounted to transmit ultrasonic ranging signals directly downward toward said traffic lane,
   (d) first circuit means measuring the time interval between the transmission of a signal and the reception of its echo from a passing vehicle,
   (e) second circuit means for comparing individual time interval data with other time interval data taken at a different instant for the same passing vehicle,
   (f) third circuit means for determining maximum vehicular height from successive interval data, said means being operative to compare successive individual interval data and to reject individual data, indicative of vehicle maximum height, that differs excessively from prior time-adjacent interval data and is not verified by subsequent repetition,
   (g) fourth circuit means for accumulating successive interval data for determination of average vehicle height, and
   (h) memory storage for retaining maximum height and average height data for known vehicle classes, to enable classification by comparison.

2. A system for detection and analysis of vehicular traffic over a roadway path, which comprises:
   (a) an ultrasonic ranging unit,
   (b) means mounting said ultrasonic ranging unit above said roadway path, at a height sufficient to accommodate vehicular passage, and directing said unit downwardly toward said roadway path,
   (c) means for periodically energizing said ultrasonic ranging unit to direct an energy pulse toward said roadway path and receive the resulting echo from a reflecting surface,
   (d) timer circuit means for measuring the interval between pulse transmission and echo reception and thereby enabling determination of distance to the reflecting surface,
   (e) first memory circuit means for temporarily storing information from said timer circuit means with respect to successive measured time intervals for comparison with the measured time intervals for one or more subsequent pulses, for detecting aberrational interval measurement, (f) second memory circuit means for storage of timing information for the smallest non-aberrational time interval measurement detected during a predetermined vehicular measurement period for determining maximum vehicle height, (g) third memory circuit means for accumulating timing information for successive non-aberrational time interval measurements in said predetermined vehicular measurement period, for deriving average vehicular height information and vehicle height profile information, and (h) detection circuit means for determining the entry and exit of a vehicle from the zone.

3. A system according to claim 2, including, (a) treadle means positioned in said roadway paths and actuated by the passage thereover of vehicle wheels, and (b) circuit means responsive to actuation at said treadle means for activating said ranging unit upon entrance of a vehicle into the operative portion of said traffic lane and for deactivating said unit upon exiting of said vehicle from said operative portion.

4. A system according to claim 2, further characterized by (a) said detection circuit means includes one or more treadle devices in said roadway path, and (b) circuit means cooperating with said treadle devices for determining the number of axles of a vehicle transiting said roadway path.

5. A system according to claim 2, further characterized by:

(a) first timing circuit means for counting measurement intervals of approximately 0.000222 seconds duration following transmission of said energy pulses, (b) second timing circuit means for effectively limiting each time interval measurement to not more than 256 measurement intervals, whereby the data for each ranging interval may be stored in a single byte of processor memory.

6. A system according to claim 5, further characterized by, (a) said system including means for filtering time interval measurements representative of measured heights less than a preestablished minimum, whereby non-vehicular intrusions are not effective to actuate the system.

7. A system according to claim 6, further characterized by, (a) means for accumulating and averaging said filtered ranging intervals to enable continuous adjustment of the reference level, as for accumulations of snow and ice.

* * * * *